United States Patent

Tanner et al.

[11] 3,994,312
[45] Nov. 30, 1976

[54] INFLATION PRESSURE REGULATOR

[75] Inventors: James L. Tanner, Reseda; George Sanchez, Compton, both of Calif.

[73] Assignee: Tanner Electronic Systems Technology, Inc., Northridge, Calif.

[22] Filed: May 19, 1975

[21] Appl. No.: 578,448

[52] U.S. Cl. ............................. 137/226; 137/510; 137/543.15; 73/146.8
[51] Int. Cl.² ........................................ F16K 15/20
[58] Field of Search ........... 137/224, 226, 223, 230, 137/510, 228, 227, 543.15, 556; 73/146.8; 251/63

[56] References Cited
UNITED STATES PATENTS

| | | | |
|---|---|---|---|
| 1,772,107 | 8/1930 | Nelson | 137/226 |
| 2,304,404 | 12/1942 | Flanagan | 251/63 X |
| 3,067,770 | 12/1962 | Fancher | 137/508 X |
| 3,491,786 | 1/1970 | Crossman | 137/226 X |
| 3,889,530 | 6/1975 | Bluem | 137/228 |
| 3,906,988 | 9/1975 | Mottram | 137/227 |

FOREIGN PATENTS OR APPLICATIONS

| | | | |
|---|---|---|---|
| 161,145 | 6/1933 | Switzerland | 137/510 |

*Primary Examiner*—Harold W. Weakley
*Attorney, Agent, or Firm*—Jessup & Beecher

[57] ABSTRACT

An inflation pressure regulator which automatically releases pressure above a predetermined maximum. The regulator has a tubular base extending into the hollow interior of a housing. A collar slideably mounted on the tubular base is biased against the interior of the housing with a coil spring to regulate the pressure. An inflation gas is supplied through the neck of the housing which has a plunger extending through the tubular base. A threaded cavity in the base permits permanent installation on an inflation valve.

4 Claims, 2 Drawing Figures

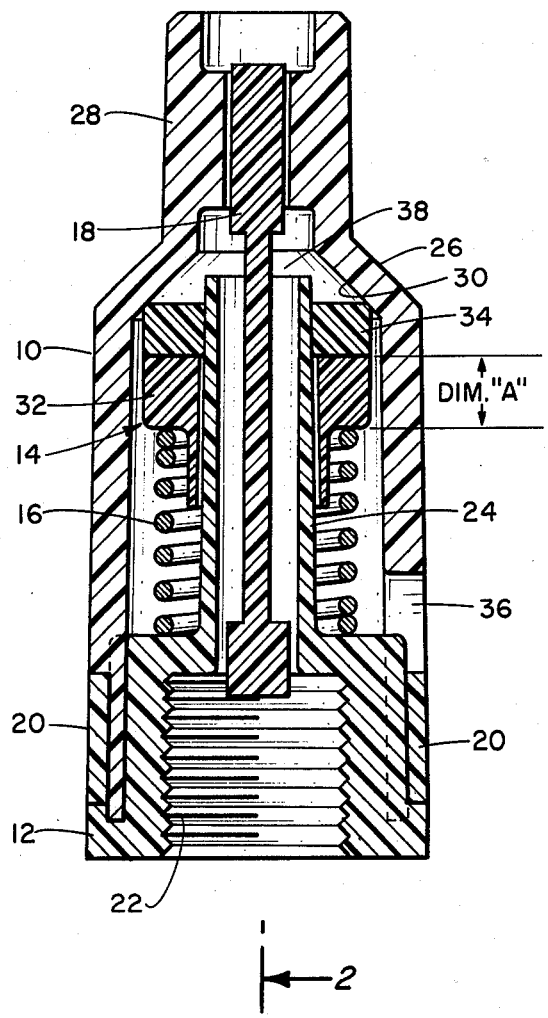
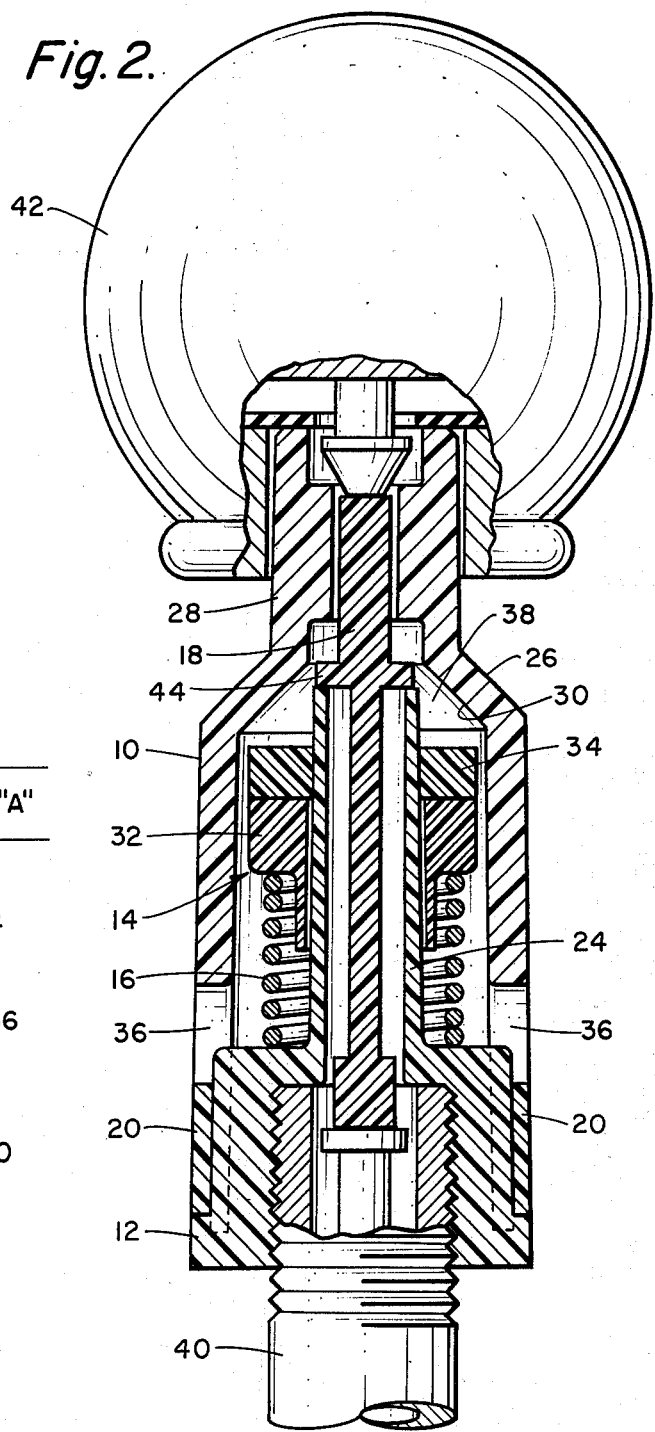

INFLATION PRESSURE REGULATOR

BACKGROUND OF THE INVENTION

The invention relates generally to pressure regulators and more particularly relates to devices for automatically limiting tire pressure.

Often when inflating tires, no means is readily available to indicate or limit the maximum pressure. In small tires, such as those used on bicycles, extreme caution must be exercised because maximum pressure is quickly reached. Further, tire inflation can be a nuisance because accurate pressure cannot be achieved without constant checking.

There are devices available which limit tire inflation pressure but they are generally complicated devices with valves, springs, balls and vent tubes. One such device has separate supply and vent tubes and must be held in place during inflation. It would be desirable if the device could permanently be installed and automatically limit tire inflation pressure whenever a gas is supplied.

The invention disclosed provides such a solution and yet is simple in construction and easy to use. When installed on a valve, a plunger may be activated to force the valve stem down, permitting inflation. Surrounding the plunger is a vent tube and cavity between the regulator housing and vent tube. A spring-biased collar between the vent tube and housing releases excess gas when a tire is inflated to maximum pressure. The thickness of the collar determines maximum pressure by increasing the spring pressure.

It is one object of the present invention to provide an inflation pressure regulator which is simple in construction and easy to use.

Yet another object of the present invention is to provide a pressure regulator which can be permanently installed.

Still another object of the present invention is to provide a pressure regulator which can be adapted for a variety of pressures by a simple change in construction.

These and other objects will become obvious when the following disclosure is considered in conjunction with the accompanying drawings.

BRIEF DESCRIPTION OF THE DRAWINGS

FIG. 1 is a sectional view of the inflation pressure regulator.

FIG. 2 is a sectional view of the air pressure regulator taken along line 2—2 of FIG. 1 illustrating its operation.

DETAILED DESCRIPTION OF THE PREFERRED EMBODIMENT

Referring to FIG. 1, there is shown an inflation pressure regulator comprised of a housing 10, base 12, collar 14, spring 16, and plunger 18. Around the circumference of the regulator between the base 12 and housing 10 is a ring 20 coded with color or in some other convenient manner to indicate the pressure rating of the regulator.

The tubular base 12 is constructed with a threaded cavity 22 which fits most standard valves and a vent tube 24 extending into the interior of housing 10. Slideably mounted on the vent tube 24 is a collar 14 which controls the maximum inflation pressure.

Housing 10 narrows down at 26 to neck 28 which fits the nozzle of a standard air hose. The narrowing portion 26 provides a seat surface 30 to assure a good seal. The housing 10 and base 12 are preferably made from a non-corrosive material such as a polyvinylchloride (PVC) plastic. They are fastened to each other in any suitable fashion such as with a resin cement.

Collar 14 is comprised of a solid pressure ring 32 seated on spring 16 and a pad of resilient material 34 attached to the ring. The spring 16 between the base 12 and pressure ring 32 forces the resilient pad 34 against the seat surface 30 to seal a tire from leakage. The sealing provided by collar 14 acting against seat surface 30 closes off vent tube 24 preventing the escape of gas from a pressurized container such as a tire. Inflation pressure above a predetermined amount forces the collar 14 down, allowing excess pressure to escape through a plurality of vent holes 36 in the housing 10. Four or more equally spaced vent holes 36 should be adequate.

An important feature of the regulator is the manner in which a variety of pressure ratings can be provided for by a simple change in construction. The pressure rating is determined very easily by the thickness (DIM "A") of pressure ring or spacer 32. That is an increase in DIM "A" will increase the compressive force of spring 16, permitting a higher inflation pressure. Conversely, decreasing DIM "A" will lower the maximum inflation pressure.

For permanent installation cavity 22 is threaded, permitting the regulator to be screwed on a valve. When screwed on a valve, plunger 18 lightly contacts the end of the valve stem and will allow air (or other gas) to be released through the vent tube into cavity 38 above collar 14, if activated. As long as the tire pressure is below the rating of the regulator, no gas will escape. The manner in which neck 28 permits tire inflation while the regulator is permanently installed is illustrated in FIG. 2.

FIG. 2 shows the regulator threaded on a valve 40. An air hose nozzle 42, when pressed over neck 28, presses down on plunger 18 to release the stem of valve 40. Extensions 44 on plunger 18 act to retain the plunger between the housing 10 and vent tube 24 of the base 12. This allows air to flow from nozzle 42 through the regulator into a tire or other device being inflated. When the tire is inflated to the pressure rating of the regulator, collar 14 will open causing air to rush out vent holes 36. Thus a tire can be quickly inflated by simply screwing on the regulator and applying an air hose nozzle until the user hears or feels air rushing out vent holes 36. The regulator can then simply be unscrewed for use on another tire or left on permanently.

Obviously many modifications will become apparent to those skilled in the art in light of the above teachings. Thus, within the scope of the appended claims the invention may be practiced other than as specifically described.

What is claimed is:

1. A readily removable tire inflation regulator comprising:
    a hollow housing having a cylindrical section narrowing down to a narrow neck adapted to receive an air hose nozzle at one end and at least one aperture in the cylindrical surface at the other end;
    a base attached to said housing having a cylindrical threaded cavity adapted to removably attach the regulator to a tire valve;

said base having an integral elongate vent tube at the terminus of the threaded cavity extending into the hollow housing to a point near the neck;

a collar slideably fitted over said tube between the tube and the housing;

a spring biasing said collar against the inside surface of the narrowing down portion of said housing to seal the regulator preventing the escape of air from said tube below a predetermined pressure during inflation;

a plunger retained between said vent tube and said neck;

said plunger extending into said neck adapted to engage a stem in a nozzle of an air hose at one end and into the threaded cavity adapted to engage a stem in a valve at the other end; and shoulder extension means mounted on said plunger between the end of the vent tube and the neck to retain the plunger.

2. The pressure regulator according to claim 1 wherein said collar comprises:
   a pressure ring;
   a resilient seal attached to said pressure ring.

3. The pressure regulator according to claim 2 wherein the maximum pressure is determined by the thickness of said pressure ring.

4. The pressure regulator according to claim 3 wherein said pressure ring comprises:
   a changeable spacer for varying the force of said spring;
   said spacer being comprised of a ring of solid material of selectively different thicknesses which may be inserted between the resilient seal and the spring whereby the release pressure of said regulator may be increased or decreased.

* * * * *